United States Patent [19]

Munch

[11] 3,948,787

[45] Apr. 6, 1976

[54] CAPACITOR AND DIELECTRIC IMPREGNANT COMPOSITION THEREFOR

[75] Inventor: Ralph H. Munch, Webster Groves, Mo.

[73] Assignee: Monsanto Company, St. Louis, Mo.

[22] Filed: Dec. 12, 1973

[21] Appl. No.: 424,037

Related U.S. Application Data

[62] Division of Ser. No. 357,158, May 4, 1973, abandoned.

[52] U.S. Cl. ............... 252/63.7; 252/64; 317/258
[51] Int. Cl.² ..................... H01B 3/18; H01G 4/02
[58] Field of Search ............ 252/63.7, 64; 317/258, 317/259

[56] References Cited
UNITED STATES PATENTS

| 1,769,874 | 7/1930  | Boyer ........................ 252/63.7 |
| 2,410,714 | 11/1946 | Clark ........................ 317/258 |
| 2,434,540 | 1/1948  | Berberich .................. 252/63.7 |
| 3,242,402 | 3/1966  | Stahr et al. ................ 252/64 |
| 3,370,012 | 2/1968  | Robinson .................... 252/63.7 |
| 3,754,173 | 8/1973  | Eustance .................... 252/63.7 |

*Primary Examiner*—Leland A. Sebastian
*Assistant Examiner*—Josephine Lloyd
*Attorney, Agent, or Firm*—William H. Duffey

[57] ABSTRACT

Electrical capacitors are impregnated with liquid dielectric compositions comprising mixtures of diaryl sulfones and esters of carboxylic acids.

8 Claims, 2 Drawing Figures

CAPACITOR AND DIELECTRIC IMPREGNANT COMPOSITION THEREFOR

This is a division of application Ser. No. 357,158, filed May 4, 1973, now abandoned.

BACKGROUND OF INVENTION

1. Field of Invention

The present invention relates to capacitors of the type consisting of wound or stacked alternating conducting layers and dielectric layers enclosed in a sealed case, and to a liquid dielectric composition suitable for impregnating such capacitors.

2. Description of Prior Art

A common type of electrical capacitor comprises a combination of spaced metal foil conductors having interposed therebetween a dielectric sheet which may be paper, polymeric film or a combination of paper and polymeric film. The dielectric sheet material and the interstices within the dielectric sheet and between the dielectric sheet and the conductors are impregnated with a liquid dielectric composition. Such impregnation is essential in order to realize the greatest dielectric strength of the dielectric material.

The preferred dielectric composition for impregnating capacitors has heretofore been polychlorinated biphenyl which has a relatively high dielectric constant and good low temperature properties. Certain of the polychlorinated biphenyls however, have now been discovered to be resistant to natural degradation and, when released into the environment, these materials may enter the life cycle and be potentially harmful to ecology. Even though capacitors are sealed units and escape of the impregnant into the environment can be prevented to a large degree, it has nevertheless become desirable to provide an alternate composition for impregnating capacitors which does not contain potentially harmful polychlorinated biphenyls.

It is accordingly an object of the present invention to provide a dielectric fluid composition for impregnating electrical capacitors which is free of polychlorinated biphenyls. It is a further object of this invention to provide capacitors containing said alternate dielectric fluid composition. Other objects of this invention will be apparent from the ensuing description and claims.

SUMMARY

The compositions of the present invention which are useful as impregnants for capacitors of the type having alternate layers of a metal foil conductor and a sheet of solid dielectric material comprise mixtures of a diaryl sulfone such as tolylxylyl sulfone and an ester of a carboxylic acid.

Capacitors containing said compositions may be constructed and impregnated according to standard procedures. The dielectric sheet material interposed between the metal foil conductors may be paper, polymeric film such as polypropylene, or a combination of paper and film. Such capacitors impregnated with the compositions of the present invention are characterized by a low dissipation factor, high dielectric constant and good low temperature performance.

DESCRIPTION OF PREFERRED EMBODIMENTS

Figure 1:
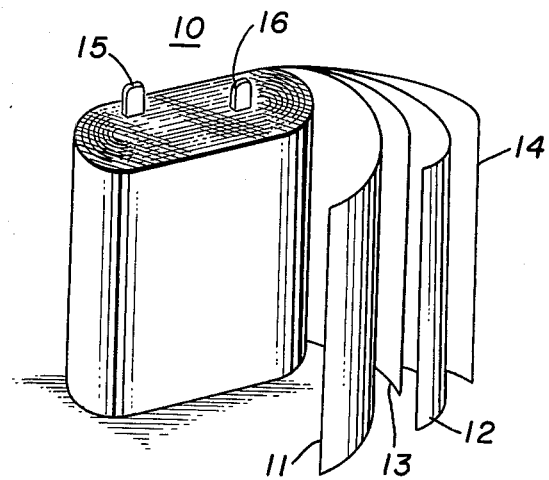
FIG. 1 is a perspective view of a partially uncoiled convolutely wound capacitor.

The diaryl sulfone component of the compositions of this invention preferably comprises from about 5 to about 80 percent by weight of the total dielectric fluid composition. Diaryl sulfones useful in the present invention are those represented by the structure

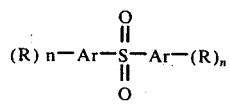

wherein each Ar is individually a phenyl, naphthyl, or indane radical, each R is individually a halogen or an alkyl radical of 1 to about 8 carbon atoms, and each n is individually an integer of from 0 to 3.

Representative diaryl sulfones encompassed by the above structure are diphenyl sulfone, ditolyl sulfone, dixylyl sulfone, phenylxylyl sulfone, tolylxylyl sulfone, phenyltolyl sulfone, indane phenyl sulfone, indane tolyl sulfone, indane dinaphthyl sulfone, naphthylphenyl sulfone, naphthylxylyl sulfone, and naphthyltolyl sulfone.

Diaryl sulfones of the present invention can be prepared according to various processes which are well known in the art. See for example, U.S. Pat. Nos. 3,579,590, 3,125,604, 3,060,193, 3,057,952 and 3,045,050, all of which are incorporated herein by reference.

Esters of carboxylic acids suitable for use in the present invention are readily obtainable by acid-catalyzed esterification processes well known in the art. Such esters can be prepared by esterifying a carboxylic acid with an alcohol in the presence of an esterification catalyst, preferably an acid esterification catalyst, employing an excess of alcohol to function as an entraining agent in removing water formed in the reaction.

The carboxylic acid reactant for preparing the ester can be any organic carboxylic acid. Non-limiting examples of such acids are acetic acid, propionic acid, butyric acid, caproic acid, caprylic acid, capric acid, lauric acid, tridecanoic acid, myristic acid, oleic acid, palmitic acid, stearic acid, acrylic acid, methacrylic acid, crotonic acid, isocrotonic acid, 3-butanoic acid, sorbic acid, malonic acid, succinic acid, adipic acid, pimelic acid, sebacic acid, dodecanoic acid, maleic acid, fumaric acid, benzoic acid, naphthoic acid, phthalic acid, isophthalic acid, terephthalic acid, naphthalic acid, pyromellitic acid, salicylic acid, azelaic acid, valeric acid, hexanoic acid, heptanoic acid, octanoic acid, nonanoic acid, decanoic acid, glutaric acid and the toluic acids. It is understood that the corresponding anhydride may be used in place of the acid, e.g., phthalic anhydride.

Thus, typical carboxylic acids utilized in preparing the esters of this invention include aliphatic dicarboxylic acids having from 4 to 10 carbon atoms and aromatic dicarboxylic acids having from 8 to 16 carbon atoms.

Alcohols which may be used in the preparation of esters for purposes of the present invention include, but are not limited to, aliphatic alcohols such as methanol, ethanol, propanol, butanol, isobutanol, amyl alcohol, isoamyl alcohol, hexyl alcohol, isohexyl alcohol, heptyl alcohol, octanol, isooctanol, 2-ethylhexanol, nonanol, isononanol, decanol, isodecanol, undecanol, tridecanol, phenylethanol, mixtures of $C_7$ to $C_{11}$ alcohols, and cyclic alcohols such as cyclohexanol. Aryl hydroxides such as phenol and its derivatives may also be utilized.

Thus, the ester component of the impregnant compositions of this invention may be saturated or unsaturated monoesters, diesters or polyesters, and may be aliphatic, aromatic or mixed aliphatic/aromatic in nature.

Alkyl esters of carboxylic acids are particularly suitable for use with diaryl sulfones in the capacitor impregnant compositions of the present invention. Such alkyl esters may be esters of mono-, di- or polycarboxylic acids.

Preferred esters for purposes of this invention are dialkyl esters of dicarboxylic acids selected from the group consisting of adipic, azelaic, sebacic, phthalic, isophthalic, orthophthalic, terephthalic and mixtures of isomeric phthalic acids. Especially preferred herein are dialkyl esters of phthalic acid wherein the esterifying alcohol is a mixture of $C_7$ to $C_{11}$ aliphatic alcohols, i.e., dialkylphthalate esters of $C_7$ to $C_{11}$ alcohols.

It is to be understood that where an ester disclosed and claimed herein is solid at room temperature, it is expedient and desirable to employ that ester in admixture with one or more liquid esters (and, of course, the sulfone) to facilitate impregnation of the capacitor.

In addition to the diaryl sulfone and the carboxylic acid ester, the dielectric fluid composition of this invention may contain minor amounts of numerous other components. In particular, it is often desirable to include a component to act as a stabilizer in the impregnated dielectric system. Generally the purpose of having a stabilizer in the system is to neutralize certain ionizable contaminants or extraneous materials which may be present or which may be formed in the system. Such contaminants may include residual catalyst or catalyst activators which remain from resin forming reactions. Contaminants may also include degradation products caused by environmental or voltage induced chemical reactions in the system. These undesirable contaminants and extraneous products have an adverse effect on the dissipation factor or power factor of the impregnated dielectric system, and stabilizing agents have been found to be highly effective in maintaining a low power factor in impregnated dielectric systems.

Examples of particularly preferred stabilizing agents are epoxides such as 1-epoxyethyl-3,4-epoxycyclohexane, 3,4-epoxycyclohexylmethyl-3,4-epoxycyclohexane carboxylate, 3,4-epoxy-6-methylcyclohexylmethyl-3,4-epoxy-6-methylcyclohexane carboxylate, and the like. These stabilizers are preferably employed in the dielectric fluid compositions of this invention in amounts in the general range of from 0.001 to about 8 percent by weight, and more preferably from about 0.1 to 3.0 percent by weight.

While the diaryl sulfone component can comprise from about 5 to about 80 percent by weight of the dielectric fluid (capacitor impregnant) composition of this invention, it is advantageously employed in about 5 to about 50 percent by weight. Thus, the ester component can be present in about 20 to about 95 percent by weight, preferably from about 50 to about 95 percent. These ranges can be adjusted, of course, to compensate for presence of the stabilizing agent.

One particularly preferred dielectric fluid composition of this invention comprises a mixture of about 10 percent by weight tolylxylyl sulfone, about 90 percent by weight of dialkylphthalate ester wherein the alkyl groups are $C_7$ to $C_{11}$, and about 0.3 percent by weight of 3,4-epoxycyclohexylmethyl-3,4-epoxycyclohexane carboxylate.

The dielectric sheet materials interposed between the conductors in the capacitor and impregnated with the dielectric fluid compositions of this invention may be comprised of a solid flexible porous material such as highly refined cellulose paper, or of a substantially nonporous polymeric film material such as a polyolefin, or of a combination of paper and polymeric film. The paper material is preferably two or more sheets of Kraft capacitor paper having an individual sheet thickness not greater than about 1.0 mil. and preferably about 0.3 mil. and a total combined thickness suitable for the design voltage of the capacitor. Such paper has a dielectric strength which is relatively good as compared to other dielectrics and has a relatively high dielectric constant. The polymeric material is preferably biaxially oriented polypropylene film although other members of the polyolefin family, particularly polyethylene and 4-methylpentene-1 have found some use in capacitor applications. Other useful polymeric materials include polyesters, polycarbonates, polyvinylidene fluoride, and polysulfone. Although either paper or polymeric film may be used alone, combinations of both are often used. The paper is positioned adjacent the polymeric film to function as a wick to pass the dielectric liquid impregnant into the area coextensive with the area of contact between the porous paper and the substantially nonporous polymeric material.

Capacitor devices employing the present invention may have the general structure and configuration as shown in FIG. 1 which is a convolutely wound capacitor 10 comprising separate electrode foils or armatures 11 and 12 and intermediate dielectric spacers 13 and 14. Terminal connectors 15 and 16 have enlarged surfaces (not shown) in contact with electrode foils 11 and 12. Electrode foils 11 and 12 may comprise one or more of a number of different materials, generally metallic and including for example aluminum, copper and stainless steel. Dielectric spacers 13 and 14 generally comprise paper and/or polymeric film as hereinbefore described. More specifically, the dielectric spacer 13 and the metallic electrode foils 11 and 12 taken together comprise a capacitor element structure. The dielectric spacer materials, and the voids within and between the materials and the electrode foils are impregnated with a dielectric fluid composition.

Figure 2:
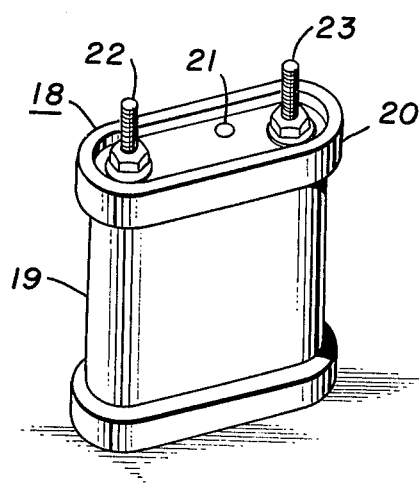
FIG. 2 shows a fully assembled capacitor which contains a convolutely wound capacitor of the type shown in FIG. 1 and a dielectric fluid impregnant.

Referring now to FIG. 2, there is shown an assembled capacitor unit 18 in which is encased a convolutely wound capacitor of the type shown in FIG. 1. The assembled unit includes a container 19, a hermetically sealed cover 20 which includes a small dielectric fluid fill hole 21 and a pair of terminals 22 and 23 projecting through cover 20 and insulated therefrom. Within the container 19 terminals 22 and 23 are connected to terminal connectors 15 and 16 shown in FIG. 1. Although not illustrated, the unit 18 shown in FIG. 2 further includes the dielectric fluid composition which occupies the remaining space in container 19 not occupied by the capacitor element and which also impregnates the dielectric spacers 13 and 14.

The impregnation of the capacitor is accomplished by using conventional procedures. For example, in one general impregnation method, capacitor units encased in assemblies such as capacitor 18 of FIG. 2 are dried under vacuum to remove residual moisture. The drying temperature will vary depending upon the length of the drying cycle but usually ranges from about 60° to 150°C. With too low a temperature, the drying period is excessively long while too high a temperature may cause decomposition of the paper or shrinkage of the polymeric film utilized as the dielectric spacer. Hole 21 permits moisture and gases to vent from the interior of container 19 during the drying process.

The impregnating dielectric liquid is admitted to the capacitor assembly through hole 21 preferably while the dried assembly is still under vacuum in a suitable evacuated enclosure. The capacitor element in the container must be submerged by the impregnating liquid and usually enough of the impregnating liquid is introduced to completely flood the container and displace all the air therein. The pressure of the enclosure is then raised to atmospheric pressure and the assembly permitted to stand or soak for a number of hours for thorough penetration of the liquid impregnant. After impregnation the capacitor unit may be sealed by applying a quantity of a suitable solder to hole 21 or by other suitable means. The capacitor assembly may thereafter be subjected to an elevated temperature to increase pressure within the capacitor assembly and aid the impregnation process. Heat and pressure may enhance impregnability by changing the relative wettability, viscosity and solubility of materials. In addition, expansion and contraction of individual components of the system which may be the result of heat and pressure may act as a driving force to induce migration of the liquid into the interstices of the dielectric spacer material.

Numerous capacitors of the type illustrated in FIGS. 1 and 2 were constructed of aluminum foil and paper separators and were impregnated according to the foregoing description with a dielectric composition comprising 10.0 weight percent tolylxylyl sulfone, 89.7 weight percent dialkylphthalate ($C_7$ to $C_{11}$), and 0.3 weight percent 3,4-epoxycyclohexylmethyl-3,4-epoxycyclohexane carboxylate. Eight of these capacitors, designated "Test Capacitors", were subjected to an accelerated service test. The results of this test were compared to those obtained with eight capacitors of identical type, the latter having been impregnated in a like manner with an electrical grade polychlorinated biphenyl containing about 42 percent chlorine, designated as "Control Capacitors". The impregnant for the Control Capacitors contained 0.3 percent by weight 3,4-epoxycyclohexylmethyl-3,4-epoxycyclohexane carboxylate.

Test conditions and results of the aforementioned tests are presented in Tables I and II below. Table I pertains to the Test Capacitors and Table II pertains to the Control Capacitors.

TABLE I

| | TEST CAPACITOR* PERFORMANCE | | | | | |
|---|---|---|---|---|---|---|
| | Temperature °C. | 22° | 90° | 90° | 90° | 90° |
| | Voltage | 600 | 870 | 870 | 870 | 870 |
| Test Conditions | Time, Hours | 0 | 139 | 307 | 475 | 715 |
| Capacitor No. 1 | Dissipation Factor | .00338 | .00306 | .00297 | .00295 | .00293 |
| | Capacitance, Microfarads | 1.951 | 1.836 | 1.835 | 1.835 | 1.835 |
| Capacitor No. 2 | Dissipation Factor | .00337 | .00311 | .00303 | .00302 | .00299 |
| | Capacitance, Microfarads | 1.937 | 1.822 | 1.821 | 1.821 | 1.820 |
| Capacitor No. 3 | Dissipation Factor | .00334 | .00325 | .00313 | .00312 | .00311 |
| | Capacitance, Microfarads | 1.954 | 1.836 | 1.835 | 1.835 | 1.835 |
| Capacitor No. 4 | Dissipation Factor | .00346 | .00325 | .00315 | .00313 | .00311 |
| | Capacitance, Microfarads | 1.966 | 1.847 | 1.846 | 1.846 | 1.846 |
| Capacitor No. 5 | Dissipation Factor | .00347 | .00325 | .00319 | .00318 | .00315 |
| | Capacitance, Microfarads | 1.954 | 1.838 | 1.837 | 1.837 | 1.837 |
| Capacitor No. 6 | Dissipation Factor | .00332 | .00334 | .00321 | .00319 | .00315 |
| | Capacitance, Microfarads | 1.962 | 1.847 | 1.846 | 1.846 | 1.846 |
| Capacitor No. 7 | Dissipation Factor | .00331 | .00330 | .00324 | .00322 | .00321 |
| | Capacitance, Microfarads | 1.953 | 1.835 | 1.834 | 1.834 | 1.834 |
| Capacitor No. 8 | Dissipation Factor | .00344 | .00332 | .00324 | .00322 | .00311 |
| | Capacitance, Microfarads | 1.954 | 1.826 | 1.826 | 1.826 | 1.825 |

*Two sheets of 0.66 mil. Kraft paper

TABLE II

| | CONTROL CAPACITOR* PERFORMANCE | | | | | |
|---|---|---|---|---|---|---|
| | Temperature °C. | 22° | 90° | 90° | 90° | 90° |
| | Voltage | 600 | 870 | 870 | 870 | 870 |
| Test Conditions | Time, Hours | 0 | 139 | 307 | 475 | 715 |
| Capacitor No. 1 | Dissipation Factor | .00345 | .00305 | .00302 | .00298 | .00294 |
| | Capacitance, Microfarads | 1.955 | 1.841 | 1.840 | 1.841 | 1.840 |
| Capacitor No. 2 | Dissipation Factor | .00335 | .00314 | .00306 | .00303 | .00304 |
| | Capacitance, Microfarads | 1.958 | 1.841 | 1.841 | 1.841 | 1.841 |
| Capacitor No. 3 | Dissipation Factor | .00337 | .00321 | .00318 | .00313 | .00311 |
| | Capacitance, Microfarads | 1.930 | 1.817 | 1.817 | 1.819 | 1.822 |
| Capacitor No. 4 | Dissipation Factor | .00334 | .00322 | .00315 | .00311 | .00309 |
| | Capacitance, Microfarads | 1.961 | 1.845 | 1.844 | 1.844 | 1.844 |
| Capacitor No. 5 | Dissipation Factor | .00334 | .00327 | .00322 | .00319 | .00321 |
| | Capacitance, Microfarads | 1.918 | 1.805 | 1.807 | 1.811 | 1.815 |
| Capacitor No. 6 | Dissipation Factor | .00334 | .00330 | .00322 | .00317 | .00315 |
| | Capacitance, Microfarads | 1.957 | 1.850 | 1.842 | 1.842 | 1.842 |
| Capacitor No. 7 | Dissipation Factor | .00332 | .00339 | .00326 | .00320 | .00318 |
| | Capacitance, Microfarads | 1.965 | 1.850 | 1.850 | 1.850 | 1.850 |
| Capacitor No. 8 | Dissipation Factor | .00333 | .00331 | .00328 | .00323 | .00319 |
| | Capacitance, Microfarads | 1.942 | 1.829 | 1.828 | 1.828 | 1.828 |

*Two sheets of 0.66 mil. Kraft paper

All 16 capacitors were subjected to test conditions which are considered extreme in comparison to normal commercial tests for capacitors. The test temperature was 90°C. and the test voltage was 870 volts. Thus, the test conditions of Tables I and II exceed normal test temperatures by 20°C. The rated capacitor voltage is exceeded by 50 percent. It is widely recognized that such a 20°C. increase in temperature would decrease the capacitor life by a factor of 4.

The data in Table I illustrate the comparable performance and reliability of capacitors impregnated with a dielectric fluid composition of this invention with respect to like capacitors of the prior art, the latter data found in Table II. Despite the rigorous and accelerated test conditions, no failures of Test Capacitors were encountered during the time period set forth. Thus, the objective of finding an alternate dielectric fluid for polychlorinated biphenyls, while retaining equivalent electrical performance, has been achieved herein.

The preceding examples and data of Table I serve to illustrate a preferred embodiment of the invention, but the invention is not to be limited to the composition or capacitors defined therein. The invention encompasses generically defined dielectric fluid compositions as hereinbefore described, and capacitors containing such compositions. In addition, although the examples and discussions have been directed to capacitors constructed of individual sheets of conductors and insulators, it is understood that metallized film can also be used in conjunction with the dielectric fluid compositions defined herein and capacitors constructed therefrom are included within the scope of this invention. Accordingly, the invention is not to be limited except as defined by the claims appended hereto.

The embodiments of this invention in which an exclusive property or privilege is claimed are defined as follows:

1. A composition useful as a capacitor impregnant comprising a mixture of a diaryl sulfone and an ester of a carboxylic acid selected from the group consisting of aliphatic dicarboxylic acids having from 4 to 10 carbon atoms and aromatic dicarboxylic acids having from 8 to 16 carbon atoms.

2. A composition of claim 1 wherein the diaryl sulfone is present in an amount of from about 5 to about 80 percent by weight.

3. A composition of claim 2 containing from about 0.001 to 8 percent by weight of an epoxide stabilizer.

4. A composition of claim 2 wherein the diaryl sulfone is represented by the structure

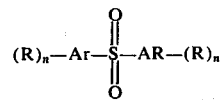

wherein each Ar is individually a phenyl, naphthyl or indane radical, each R is individually a halogen or an alkyl radical of 1 to about 8 carbon atoms, and each n is individually an integer of from 0 to 3.

5. A composition of claim 4 wherein the diaryl sulfone is present in an amount of from about 5 to about 50 percent by weight with the balance of the composition comprising a dialkyl ester of a dicarboxylic acid selected from the group consisting of adipic, azelaic, sebacic, succinic, isophthalic, orthophthalic, terephthalic and mixtures of isomeric phthalic acids.

6. A composition of claim 5 wherein the diaryl sulfone is tolylxylyl sulfone.

7. A composition of claim 6 wherein the ester is a dialkylphthalate ester of $C_7$ to $C_{11}$ alcohols.

8. A composition of claim 7 containing from about 0.1 to 3 percent by weight 3,4-epoxycyclohexyl-methyl-3,4-epoxycyclohexane carboxylate.

* * * * *